US 6,619,916 B1

(12) United States Patent
Capozzi et al.

(10) Patent No.: US 6,619,916 B1
(45) Date of Patent: Sep. 16, 2003

(54) METHODS AND APPARATUS FOR VARYING GAS TURBINE ENGINE INLET AIR FLOW

(75) Inventors: Joseph Capozzi, North Reading, MA (US); Ruby Lasandra Zenon, Malden, MA (US); Alan Glen Turner, Cincinnati, OH (US); Carol Vaczy Wallis, Peabody, MA (US); Peter Nicholas Szucs, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/086,018

(22) Filed: Feb. 28, 2002

(51) Int. Cl.[7] ............................................... F01D 17/16
(52) U.S. Cl. ..................... 415/160; 415/161; 415/191
(58) Field of Search .................................. 415/151, 155, 415/159, 160, 161, 191

(56) References Cited

U.S. PATENT DOCUMENTS

| 4,013,377 A | * | 3/1977 | Amos | 415/161 |
| 4,950,129 A | | 8/1990 | Patel et al. | |
| 4,972,671 A | * | 11/1990 | Asselin et al. | 60/39.08 |
| 5,911,679 A | | 6/1999 | Farrell et al. | |
| 6,045,325 A | | 4/2000 | Horvath et al. | |

* cited by examiner

Primary Examiner—Ninh H. Nguyen
(74) Attorney, Agent, or Firm—William Scott Andes; Armstrong Teasdale LLP; Robert B. Reeser, III

(57) ABSTRACT

A method for assembling an articulated fan front frame for a gas turbine engine facilitates improving engine performance. The method includes forming a strut including a pair of sidewalls connected at a leading edge and a trailing edge, forming a flap including a first sidewall and a second sidewall connected at a leading edge and a trailing edge, and extending in radial span between a root endwall and a tip endwall, wherein each endwall extends between the first and second sidewalls, and wherein at least one of the root endwall and the tip endwall is contoured in a radial direction extending between the flap leading and trailing edges, and pivotally coupling the flap downstream from the strut such that a gap is defined between the flap and the strut.

18 Claims, 4 Drawing Sheets

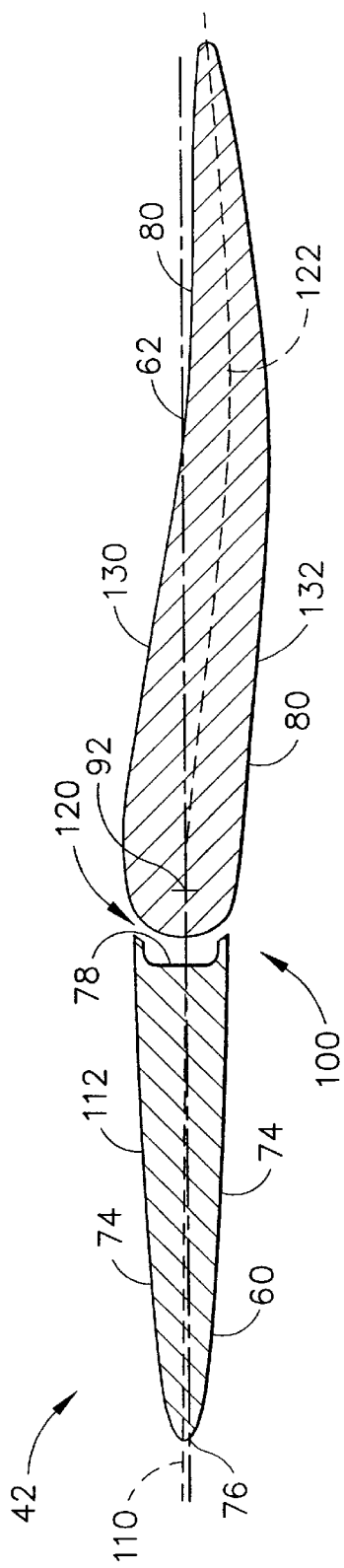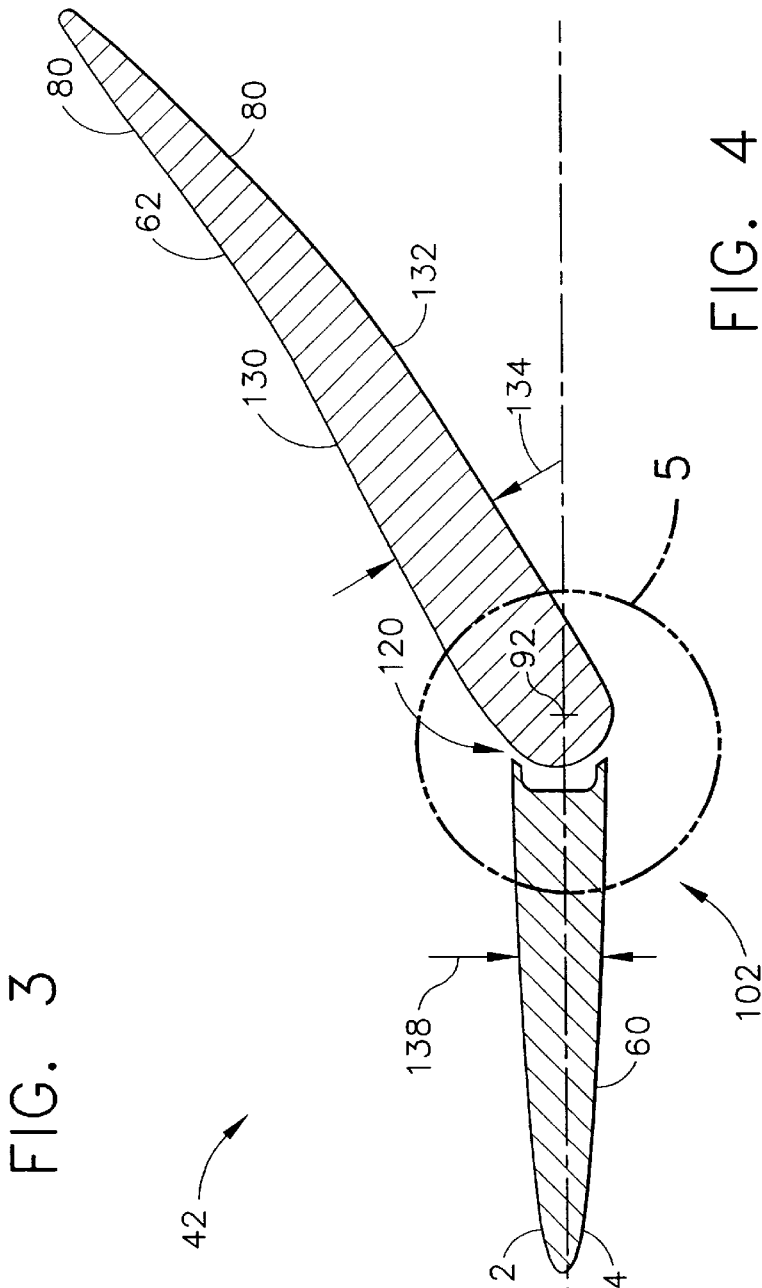

METHODS AND APPARATUS FOR VARYING GAS TURBINE ENGINE INLET AIR FLOW

BACKGROUND OF THE INVENTION

This invention relates generally to gas turbine engine front frames and more particularly, to articulated fan front frames for gas turbine engines.

Gas turbine engines include a fan front frame that channels airflow entering the turbine engine downstream into the core engine. At least some known gas turbine engines include articulated inlet guide vane assemblies that extend substantially circumferentially within the engine. Each inlet guide vane assembly includes a fixed strut and a variable flap that is coupled downstream from the strut.

The flaps are variably positionable during engine operation to facilitate improving engine performance over a wide range of engine operations. More specifically, as the engine is operated at design operating conditions, the flaps are generally axially aligned with respect to each respective strut. An orientation of the flaps is determined by the design of the engine and the conditions at which the engine is operated. During off-design operating engine conditions, the flaps are rotated to a closed position to selectively control an angle at which incoming airflow impinges a first row of blades of a downstream compressor.

To facilitate optimizing engine operating efficiency and stability, it is important that a smooth airflow transition occurs through the inlet guide vane assembly and immediately downstream thereof at all engine operating conditions. However, in at least some known inlet guide vane assemblies, certain rotational orientations of the flap may generate turbulence in the airflow downstream from the flap. Such turbulence may cause a non-integral rotor blade vibration known as "flutter" and/or high airfoil stresses in the blades of the fan immediately downstream of the inlet guide vanes. More specifically, air flowing past an inlet guide vane assembly has a tendency to flow from a pressure side of the flaps to a suction side of the flaps. The flow of air between the strut and the flap can cause separation of the airflow from the suction side of the inlet guide vane assembly, which may introduce turbulence into the airflow entering the fan blades. Continued engine operation with flutter may damage a fan blade, shorten its useable life, or restrict operation of the engine.

BRIEF SUMMARY OF THE INVENTION

In one aspect, a method for assembling an articulated fan front frame for a gas turbine engine is provided. The method comprises forming a strut including a pair of sidewalls connected at a leading edge and a trailing edge, forming a flap including a first sidewall and a second sidewall connected at a leading edge and a trailing edge, and extending in radial span between a root endwall and a tip endwall, wherein each endwall extends between the first and second sidewalls, and wherein at least one of the root endwall and the tip endwall is contoured in a radial direction extending between the flap leading and trailing edges, and pivotally coupling the flap downstream from the strut such that a gap is defined between the flap and the strut.

In another aspect, a fan front frame assembly for a gas turbine engine is provided. The fan front frame assembly includes at least one articulated inlet guide vane sub-assembly including a strut and a flap that is downstream from the strut. At least one of the strut and the flap is variable positioned during engine operation. The flap includes a first sidewall and a second sidewall connected at a leading edge and a trailing edge, and extends in radial span between a root endwall and a tip endwall. Each flap endwall extends between the first and second sidewalls, and at least one of the root endwall and the tip endwall is radially arcuate between the flap leading and trailing edges.

In a further aspect, a gas turbine engine that is operable between design and off-design conditions is provided. The engine includes a fan front frame assembly including at least one articulated inlet guide vane sub-assembly that is configured to channel airflow entering the engine downstream. The inlet guide vane sub-assembly includes a strut and a flap that is downstream from the strut. The flap includes a pair of sidewalls that are connected at a leading and a trailing edge, and extend radially between a tip endwall and a root endwall. At least one of the tip endwall and the root endwall extend between the pair of sidewalls and are contoured in a radial direction between the flap leading and trailing edges.

BRIEF DESCRIPTION OF THE DRAWINGS

FIG. 3 is a cross-sectional schematic view of the inlet guide vane assembly shown in FIG. 2 in a design setting;

FIG. 4 is a cross-sectional schematic view of the inlet guide vane assembly shown in FIG. 2 in an off-design setting;

DETAILED DESCRIPTION OF THE INVENTION

Figure 1:
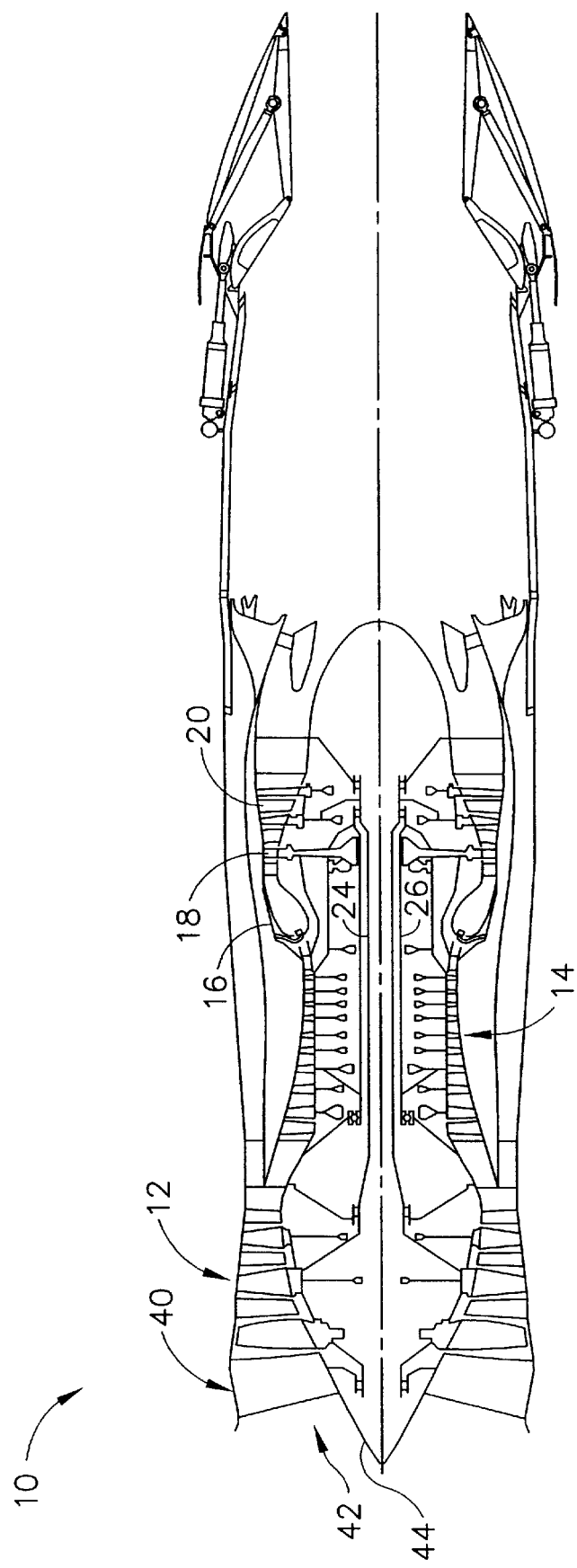
FIG. 1 is a schematic illustration of a gas turbine engine including an inlet guide vane assembly.

FIG. 1 is a schematic illustration of a gas turbine engine 10 including a fan assembly 12, a high pressure compressor 14, and a combustor 16. In one embodiment, engine 10 is an F110 engine commercially available from General Electric Company, Cincinnati, Ohio. Engine 10 also includes a high pressure turbine 18 and a low pressure turbine 20, all arranged in a serial, axial flow relationship. Fan assembly 12 and turbine 20 are coupled by a first shaft 24, and compressor 14 and turbine 18 are coupled by a second shaft 26.

Engine 10 also includes an annular frame 40 which supports a bearing (not shown) which, in turn, supports one end of a shaft, such as shaft 24, for allowing rotation thereof. A plurality of circumferentially-spaced inlet guide vane assemblies 42 extend between an outer structural case ring (not shown in FIG. 1) and a center hub 44 and direct airflow entering engine 10 downstream to compressor 14.

In operation, air flows through inlet guide vane assembles 42 and through fan assembly 12, such that compressed air is supplied from fan assembly 12 to high pressure compressor 14. The highly compressed air is delivered to combustor 16. Airflow from combustor 16 drives rotating turbines 18 and 20 and exits gas turbine engine 10. Engine 10 is operable at a range of operating conditions between design operating conditions and off-design operating conditions.

Figure 2:
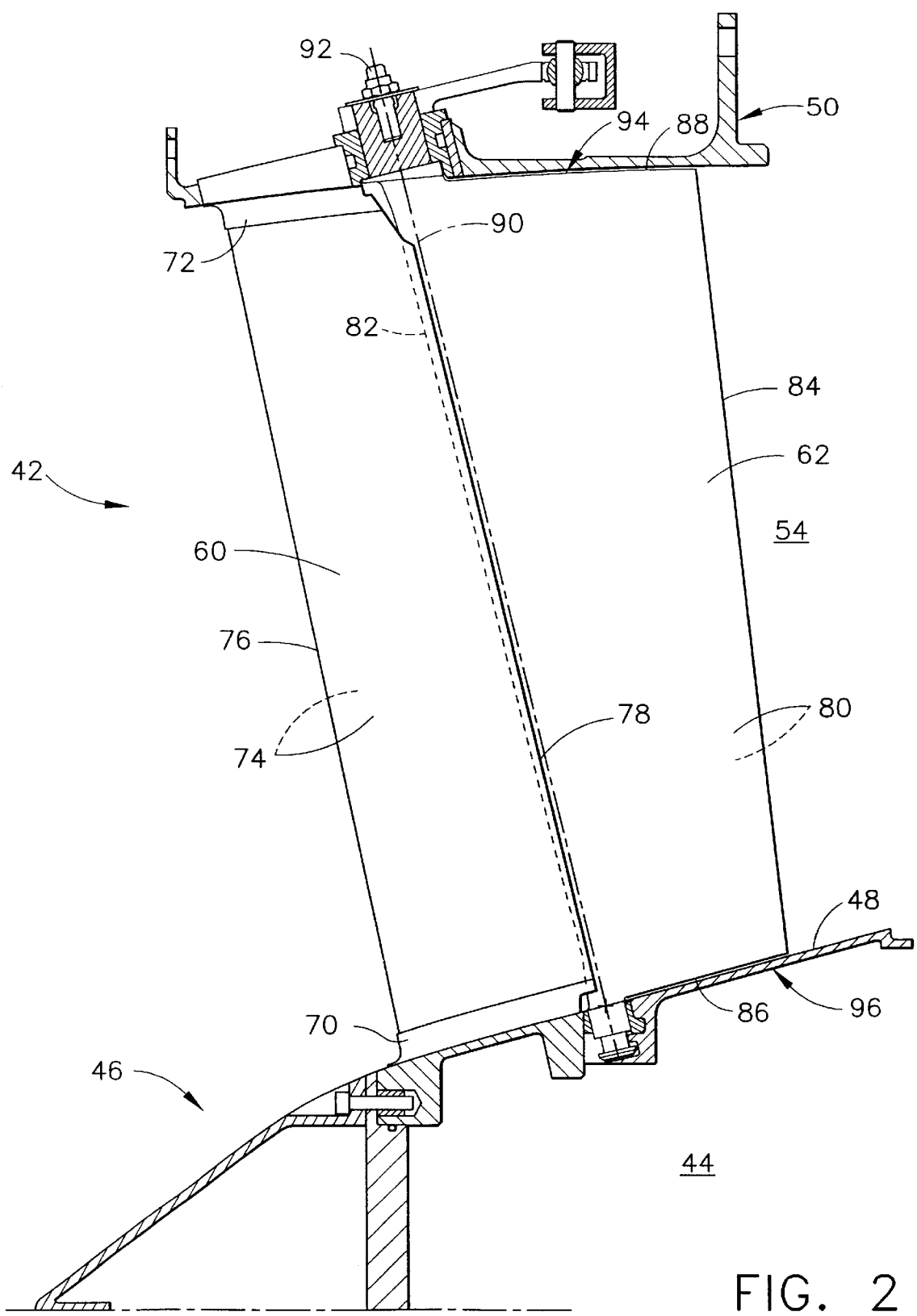
FIG. 2 is an enlarged side view of the inlet guide vane assembly shown in FIG. 1.

FIG. 2 is an enlarged side view of an inlet guide vane assembly 42 mounted within engine 110. More specifically, inlet guide vane assembly 42 is positioned within an inlet 46 of engine 10. Engine inlet 10 includes an inner shroud 46 adjacent engine center hub 46, and an annular outer casing 50. Outer casing 50 is radially outward from inner shroud 26 such that an air flowpath 54 is defined therebetween. A plurality of inlet guide vane assemblies 42 extend radially through flowpath 54 from hub 46 to casing 50. In the exemplary embodiment, outer casing 50 is non-planar and contoured adjacent inlet guide vane assemblies 42. More specifically, in the exemplary embodiment, outer casing 50 is contoured with a continuous radius such that a substantially spherical flowpath is defined through inlet guide vane assembly 42. In another embodiment, hub 46 is also contoured adjacent inlet guide vane assemblies 42.

Each inlet guide vane assembly 42 includes both a strut airfoil 60 and a flap airfoil 62. Struts 60 are spaced about a circumference of the hub 46 and structurally support annular casing 50 in spaced relation to hub 46. Accordingly, each strut 60 is fixedly secured to hub 46 and casing 50. Struts 60, described in more detail below, are aerodynamically shaped to deflect air entering engine inlet 46 around strut 60 towards flap airfoils 62. Each strut 60 has a strut root end 70 coupled to hub 46 and a tip end 72 that is in spaced radial relation to root end 70 and coupled to outer casing 50. Additionally, each strut 60 includes a pair of sidewalls 74 that are connected at a leading edge 76 and a trailing edge 78. Trailing edge 78 is downstream and axially-spaced from leading edge 76.

Flap airfoils 62, herein referred to as flaps 62, are immediately downstream from each strut 62, and each includes a pair of sidewalls 80 connected at a leading edge 82 and at an axially-spaced downstream trailing edge 84. Each sidewall 80 extends in radial span between a root endwall 86 and a tip endwall 88. Endwalls 86 and 88 extend between leading and trailing edges 82 and 84, respectively, and between flap sidewalls 80.

Flaps 62 are pivotally coupled within inlet guide assembly 42 and are rotatable a reference axis 90 extending through a spindle 92. Reference axis 90 is known as a "trunion axis", and is fixed relative to each strut 60. More specifically, each spindle location is selected to facilitate optimizing a gap (not shown in FIG. 2) between each respective strut 60 and flap 62. As such, leading edge 82 is in a spaced relation with a trailing edge 78 of each strut 60 immediately upstream thereof, Flaps 62, as described in more detail below, are selectively positionable during engine operation to vary an angle of impingement of airflow directed downstream to a first stage (not shown) of a fan assembly, such as fan assembly 12 shown in FIG. 1. Flap root endwall 86 is adjacent hub 46, and tip endwall 88 is adjacent outer casing 50. Accordingly, a first gap 94 is defined between tip endwall 88 and outer casing 50, and a second gap 96 is defined between root endwall 86 and hub 46.

In the exemplary embodiment, tip endwall 88 is arcuate between flap leading and trailing edges 82 and 84, respectively. More specifically, tip endwall 88 is radially contoured between flap edges 82 and 84 such that a contour of tip endwall 88 substantially mirrors a contour of outer casing 50 adjacent inlet guide vane assemblies 42. In an alternative embodiment, root endwall 86 is contoured in a radial direction between flap edges 82 and 84 and substantially mirrors a contour of hub 46 adjacent inlet guide vane assemblies 42. Accordingly, when flap 62 is pivotally coupled with respect to strut 60, the contour of flap tip endwall 88 facilitates reducing airflow gap 94 in comparison to known flap endwalls that are not contoured. More specifically, engine flap tip endwall 88 facilitates reducing endwall clearances over a higher loaded portion of flap 62 during engine off-design operating conditions.

Figure 5:
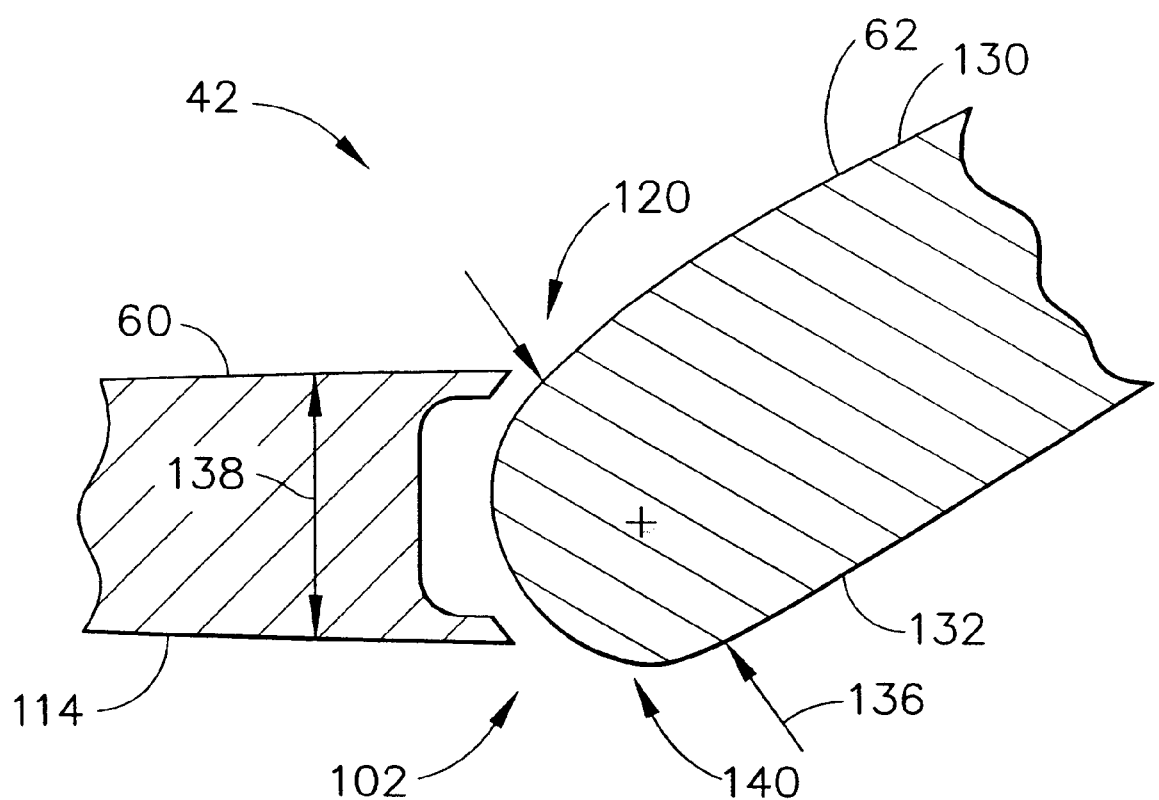
FIG. 5 is an enlarged view of the inlet guide vane assembly shown in FIG. 4 taken along area 5.

FIG. 3 is a cross-sectional schematic view of an inlet guide vane assembly 42 shown in a fully-open position 100 during engine design operating conditions. FIG. 4 is a cross-sectional schematic view of an inlet guide vane assembly 42 shown in a fully-closed position 102 during engine off-design operating conditions. FIG. 5 is an enlarged view of inlet guide vane assembly 42 taken along area 5 (shown in FIG. 4). In the exemplary embodiment, strut 60 is symmetrical and includes an axis of symmetry 110 that extends between strut leading and trailing edges. Specifically, strut sidewalls 74 are identical and are connected symmetrically at leading and trailing edges 76 and 78, respectively. More specifically, a first sidewall 112 defines a pressure side of strut 60, and a second sidewall 114 defines a suction side of strut 60. Strut trailing edge 78 is recessed with respect to sidewalls 74, such that sidewalls 74 actually extend downstream from trailing edge 78.

Inlet guide vane assembly flap 62 is positioned immediately downstream from strut 60 such that a strut-flap gap 120 is defined between flap 62 and strut 60. More specifically, during assembly, struts 60 are measured for true position with respect to engine 10 (shown in FIGS. 1 and 2) and a location for flap spindle 92 is determined and selected to facilitate proper strut/flap positioning, and to optimize strut-flap gap 120. More specifically, flap 60 includes a meanline 122 that extends between flap leading and trailing edges 82 and 84, respectively. Flap 62 is positioned with respect to strut 60 such that during engine design operating conditions, when inlet guide vane assembly 42 is in position 100, flap meanline 122 extends generally co-linearly and axially with respect to strut axis of symmetry 110.

Flap sidewalls 80 are connected at leading and trailing edges 82 and 84, respectively. More specifically, flap 62 includes a first sidewall 130 that defines a pressure side of flap 62, and a second sidewall 132 that defines a suction side of flap 62. Each flap 62 also has a thickness 134 measured between sidewalls 130 and 132, and variable along flap meanline 122. A leading edge flap thickness 136 is larger than a maximum thickness 138 of strut 60 measured between strut sidewalls 74.

Flap sidewalls 80 are arcuate between leading and trailing edges 82 and 84, respectively. More specifically, flap sidewalls 80 define a camber for flap 62 that facilitates controlling airflow acceleration around flap leading edge 82. Furthermore, the flap camber also facilitates reducing an exit swirl of airflow directed downstream from flap 62. In addition, the flap camber also facilitates reducing airflow separation from flap 62 during engine off-design operating conditions. More specifically, the flap camber facilitates reducing flap airfoil loading to delay the onset of airflow separation, thus reducing wake strengths at a given inlet guide vane assembly position.

The combination of the flap camber, the relative position of flap 62 with respect to strut 60, and flap leading edge thickness 136 enable flap 62 to define a forward-facing step 140 along flap suction side 132 during engine off-design operating conditions. More specifically, when flap 62 is pivoted during engine off-design operating conditions, suction side step 140 extends tangentially outward in a circumferential direction from strut pressure sidewall 114 and into the airflow. Futhermore, suction side step 140 also facilitates reducing crossflow from the pressure side to the suction side of flap 62 through gap 120.

During engine design operations, inlet guide vane assembly 42 is positioned in position 100. The symmetric shape of strut 60 facilitates reducing pressure-suction pressure gradients and cross-flow influences across gap 120. Furthermore, the relative position of flap 62 with respect to strut 60, and the camber of flap 62 facilitate reducing airflow separation through inlet guide vane assembly 42 and increasing a flow area through inlet guide vane assembly 42. As a result, engine performance is facilitated to be increased during engine design operating conditions.

During engine off-design operations, inlet guide vane assembly 42 is positioned in position 102. Flap leading edge thickness 136 and flap suction side step 140 facilitate reducing airflow cross flow through gap 120. As cross flow through gap 120 is reduced, airflow separation tendencies across flap 62 are also reduced. Accordingly, engine performance is facilitated to be improved, while wake strengths downstream from inlet guide vane assembly 42 are facilitated to be reduced. Furthermore, because flap endwall 88 (shown in FIG. 2) is contoured to substantially mirror that of casing 50 (shown in FIG. 2), endwall to casing clearance gap 94 during engine off-design operating conditions. Accordingly, flap 62 facilitates reducing flap loading during engine off-design operating conditions.

The above-described inlet guide vane assembly is cost-effective and highly reliable. The articulated guide vane assembly includes a fixed strut and a variable flap. The flap is positioned downstream from the strut and has a cambered shape that enables a portion of the flap suction side to define a forward facing step during engine off-design operating conditions. The forward facing step facilitates reducing flap loading and airfoil separation across the flap. The forward facing step also facilitates reducing cross flow through the gap between the strut and the flap, such that downstream wake strength is facilitated to be reduced during engine off-design operations. Furthermore, during engine design operations, the relative position of the flap with respect to the strut facilitates reducing an exit swirl of airflow directed downstream from the inlet guide vane assembly, and also facilitates increasing a cross-sectional of airflow through the inlet guide vane assembly. As a result, the inlet guide vane assembly facilitates improving engine performance during engine design and off-design operating conditions in a cost-effective and reliable manner.

While the invention has been described in terms of various specific embodiments, those skilled in the art will recognize that the invention can be practiced with modification within the spirit and scope of the claims.

What is claimed is:

1. A method for assembling an articulated fan front frame for a gas turbine engine, said method comprising:

forming a strut including a pair of sidewalls connected at a leading edge and a trailing edge; and forming a flap including a first sidewall and a second sidewall connected at a leading edge and a trailing edge, and extending in radial span between a root endwall and a tip endwall, such that at least one of the first sidewall and the second sidewall defines a forward facing step during engine off-design operating conditions, wherein each endwall extends between the first and second sidewalls, and wherein at least one of the root endwall and the tip endwall is contoured in a radial direction extending between the flap leading and trailing edges; and pivotally coupling the flap downstream from the strut such that a gap is defined between the flap and the strut.

2. A method in accordance with claim 1 wherein forming a strut further comprises forming a symmetrical strut.

3. A method in accordance with claim 1 wherein the engine includes an outer casing and a center hub, the strut and flap configured to extend therebetween, forming a flap further comprises contouring the flap tip endwall in a radial direction such that a contour along the flap tip endwall substantially mirrors that of the engine outer casing.

4. A method in accordance with claim 1 wherein forming a flap further comprises forming a flap such that a suction side of the flap defines a forward facing step during engine off-design operating conditions that is configured to facilitate reducing airflow crossflow from a pressure side of the flap to the flap suction side.

5. A method in accordance with claim 1 wherein forming a strut further comprises forming the strut to facilitate reducing pressure gradients induced from the strut to the flap during engine operation.

6. A fan front frame assembly for a gas turbine engine that is operable between design and off-design conditions, said fan front frame assembly comprising at least one articulated inlet guide vane sub-assembly comprising a strut and a flap downstream from said strut, at least one of said strut and said flap variable positioned during engine operation, said flap comprising a first sidewall and a second sidewall connected at a leading edge and a trailing edge, and extending in radial span between a root endwall and a tip endwall, each said endwall extending between said first and second sidewalls, at least one of said root endwall and said tip endwall radially arcuate between said flap leading and trailing edges, said flap first sidewall defines a suction side of said flap, said flap second sidewall defines a pressure side of said flap, said strut comprising a first sidewall defining a suction side of said strut and a second sidewall defining a pressure side of said strut, said flap suction side configured to define a forward facing step during engine off-design operating conditions.

7. A fan front frame assembly in accordance with claim 6 wherein said strut is symmetrical.

8. A fan front frame assembly in accordance with claim 6 wherein said flap pivotally coupled within said inlet guide vane sub-assembly and moveable during engine operations.

9. A fan front frame assembly in accordance with claim 6 wherein said flap positioned downstream from said strut such that a gap is defined between said strut and said flap, said strut symmetric and configured to facilitate reducing pressure gradients across said gap.

10. A fan front frame assembly in accordance with claim 9 wherein said flap suction side configured to facilitate reducing airflow separation from said flap during engine off-design operating conditions.

11. A fan front frame assembly in accordance with claim 6 wherein said flap extends radially between an engine hub and an engine casing, at least one of said root endwall and said tip endwall configured to facilitate reduce endwall clearances between said flap and at least one of the engine casing and the engine hub.

12. A fan front frame assembly in accordance with claim 6 wherein the engine is operable between design and off-design conditions, said flap has a cross-sectional profile configured to facilitate reducing airflow separation from said flap during engine off-design operating conditions.

13. A gas turbine engine operable between design and off-design conditions, said engine comprising a fan front frame assembly comprising at least one articulated inlet guide vane sub-assembly configured to channel airflow entering said engine downstream, said inlet guide vane sub-assembly comprising a strut and a flap downstream from said strut, said flap comprising a pair of sidewalls connected at a leading and a trailing edge, and extending radially between a tip endwall and a root endwall, at least one of said tip endwall and said root endwall extending between said pair of sidewalls and contoured in a radial direction between said flap leading and trailing edges, said inlet guide vane sub-assembly flap pair of sidewalls define a pressure side and a suction side of said flap, said flap suction side configured to define a forward facing step during engine off-design operating conditions, said forward facing step configured to facilitate reducing airflow crossflow from said pressure side to said suction side.

14. A gas turbine engine in accordance with claim 13 wherein said inlet guide vane sub-assembly strut comprises a pressure side and a suction side connected at a leading edge and a trailing edge, and an axis of symmetry extending between said strut leading and trailing edges.

15. A gas turbine engine in accordance with claim 14 wherein said inlet guide vane sub-assembly flap pair of sidewalls define a pressure side and a suction side of said flap, said flap suction side configured to facilitate reducing airflow separation from said flap during engine operation.

16. A gas turbine engine in accordance with claim 14 further comprising:

a hub positioned co-axially within said engine and radially inward from said inlet guide vane sub-assembly;

an outer casing radially outward from said hub and said inlet guide vane sub-assembly such that an airflow passageway is defined between said hub and said outer casing through said inlet guide vane assembly, said flap tip endwall having a contour between said flap leading and trailing edges that substantially mirrors that of said engine outer casing adjacent said inlet guide vane sub-assembly, and configured to facilitate a clearance between said flap and said outer casing during engine off-design operating conditions.

17. A gas turbine engine in accordance with claim 14 wherein said strut configured to facilitate reducing pressure gradients induced from said strut to said flap during engine operation.

18. A gas turbine engine in accordance with claim 14 wherein said inlet guide vane sub-assembly flap pivotally coupled within said guide vane sub-assembly and moveable during engine operation.

* * * * *